United States Patent
Hirao et al.

(10) Patent No.: US 6,233,957 B1
(45) Date of Patent: May 22, 2001

(54) VEHICULAR AIR CONDITIONER

(75) Inventors: Toyotaka Hirao; Makoto Fujitani, both of Nagoya (JP); Gregory A. Major, Beverly Hills; Xin Zeng, Auburn Hills, both of MI (US)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/326,639

(22) Filed: Jun. 7, 1999

(51) Int. Cl.[7] ............................ F25B 49/02
(52) U.S. Cl. ............... 62/228.3; 62/228.5; 62/323.4
(58) Field of Search .................. 62/228.3, 228.1, 62/227, 226, 228.4, 228.5, 180, 208, 209, 203, 323.4

(56) References Cited

U.S. PATENT DOCUMENTS

| | | | |
|---|---|---|---|
| 4,132,086 | * 1/1979 | Kountz | 62/228.5 X |
| 4,495,778 | * 1/1985 | Shaw | 62/228.3 X |
| 4,856,293 | * 8/1989 | Takahashi | 62/228.3 |
| 4,860,549 | * 8/1989 | Murayama | 62/228.3 X |
| 5,257,508 | * 11/1993 | Powell et al. | 62/180 |

* cited by examiner

*Primary Examiner*—Harry B. Tanner
(74) *Attorney, Agent, or Firm*—Oblon, Spivak, McClelland, Maier & Neustadt, P.C.

(57) ABSTRACT

A vehicular air conditioner which is not influenced by fluctuations in engine RPM and which provides air conditioning with low energy consumption includes a variable demand capacity compressor where the suction pressure is self-controlled and can be set using an external signal. The vehicular air conditioner includes a demand capacity change compressor which self-controls at a target suction pressure set using an external signal and based on a discharge temperature set according to an air conditioning load. The external signal sets the target suction pressure to thereby affect a refrigerating cycle operation.

6 Claims, 4 Drawing Sheets

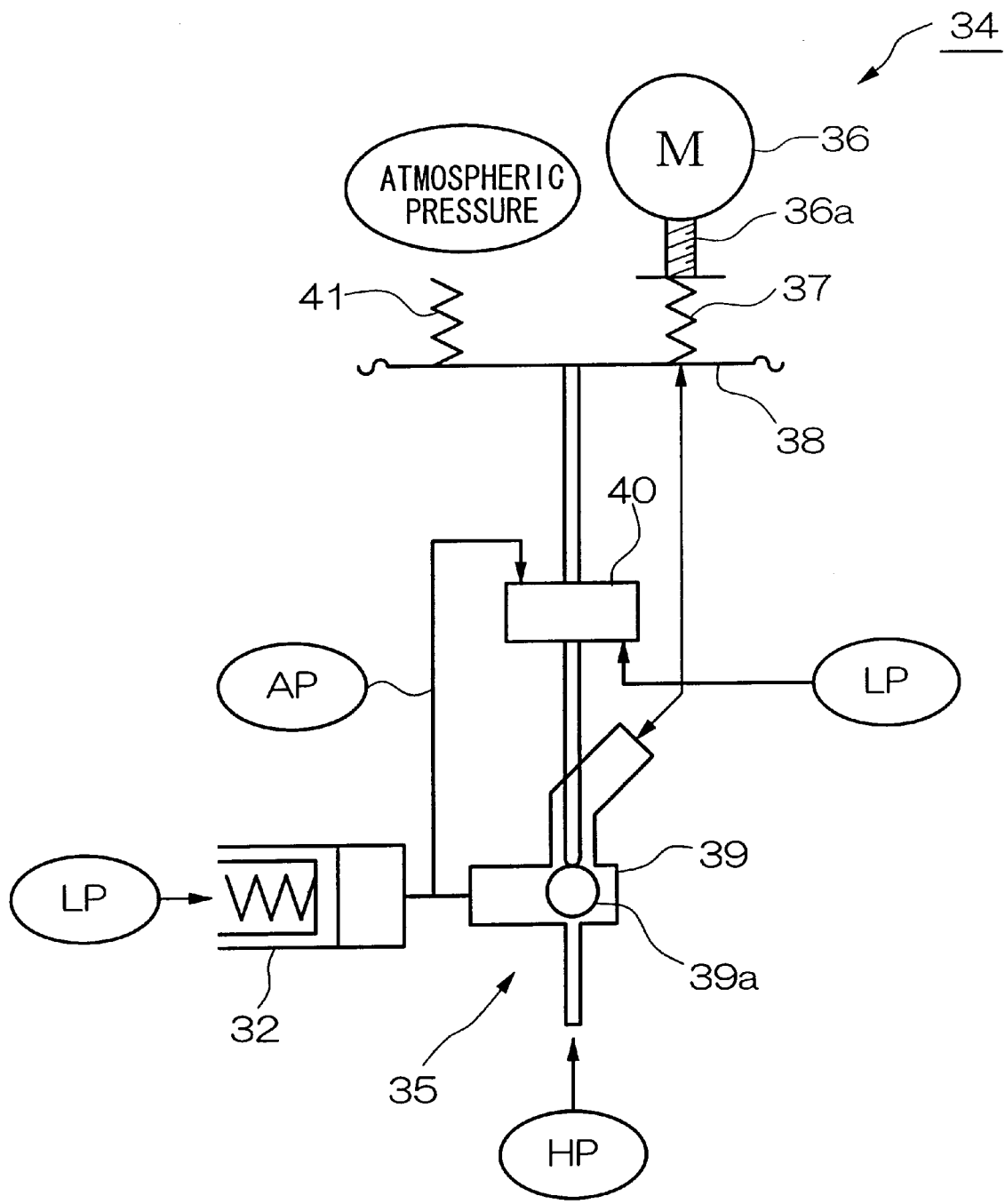

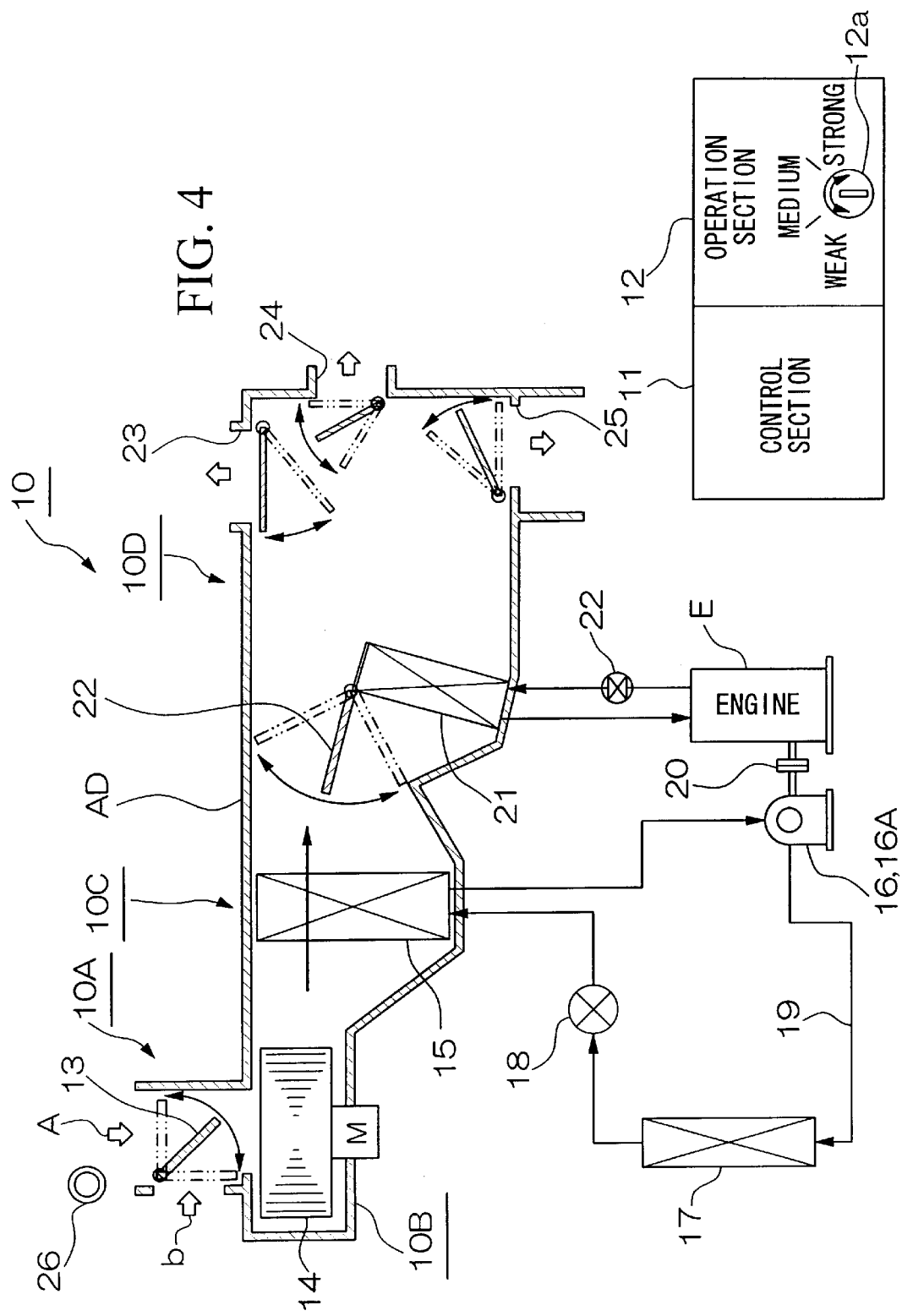

VEHICULAR AIR CONDITIONER

BACKGROUND OF THE INVENTION

1. Field of the Invention

The present invention relates to a vehicular air conditioner for controlling discharge temperature using a demand capacity change compressor.

2. Description of the Related Art

FIG. 4 shows a schematic construction of a conventional vehicular air conditioner. This vehicular air conditioner is an example of one installed in a standard automobile.

An air conditioning unit 10 for effecting cooling, heating or dehumidifying of introduced air and then discharging the air to a vehicle cabin comprises; an inside air/outside air box 10A, a blower unit 10B, a cooler unit 10C and a heater unit 10D. The air conditioning unit 10 is normally installed in a vehicle cabin under the dashboard. Moreover, numeral 11 denotes a control section for controlling various operations, and 12 denotes an operation section in which is arranged various switches which can be set up and operated according to the preference of a passenger, and an operation display section.

As follows is a brief description of the air conditioning unit 10 in air flow direction sequence.

Air introduced into the air conditioning unit 10 is selected from either outside air "a" outside of the vehicle cabin or inside air "b" inside of the vehicle cabin, by opening or closing an inside air/outside air changeover damper 13 in the inside air/outside air box 10A. Introduced outside air "a" or inside air "b" (hereinafter referred to as "introduced air") is drawn in by a blower fan 14 provided in the blower unit 10B, or as vehicle traveling wind, passed through an air conditioning duct AD and then sent to an evaporator 15 in the cooler unit 10C installed on the downstream side of the blower fan 14. To this evaporator 15 is supplied a low temperature and low pressure liquid refrigerant from a refrigerant system which forms a refrigerating cycle at the time of a cooling and dehumidifying operation, effecting cooling and dehumidifying by exchanging heat with the introduced air passing through the evaporator 15.

The refrigerant system is composed mainly of a compressor 16, a condenser 17, an expansion valve 18 and the evaporator 15, and a refrigerant circulating circuit is formed by connecting each unit with refrigerant piping 19.

The compressor 16 is connected via a compressor clutch 20 to an engine E as a drive source. The compressor 16 compresses a low temperature and low pressure gas refrigerant gasified by the evaporator 15, and supplies this to the condenser 17 as a high temperature and high pressure gas refrigerant.

The condenser 17 cools the high temperature and high pressure gas refrigerant supplied from the compressor 16 with outside air, such as traveling wind to condense and liquefy the gaseous refrigerant. The refrigerant liquefied in this way is separated into gas and liquid by a receiver (not shown), and then supplied to the expansion valve 18 as a high temperature and high pressure liquid refrigerant.

The expansion valve 18 decompresses and expands the high temperature and high pressure liquid refrigerant to give a low temperature and low pressure liquid (mist) refrigerant, and supplies the liquid refrigerant to the evaporator 15 installed in the air conditioning unit 10.

Hereafter, by circulating the refrigerant in the same manner, the refrigerating cycle is formed.

On the downstream side of the evaporator 15, a heater unit 10D is provided in a prescribed location, and a heater core 21 is installed therein. To this heater core 21 is introduced a high temperature engine coolant for which the flow rate is controlled by a water valve 22, effecting heating by exchanging heat with the passing introduced air. Moreover, the flow rate of the introduced air passing through the heater core 21 can be adjusted by the opening of an air mix damper 22.

As a result, introduced air can be adjusted to a predetermined temperature in the heater unit 10D, or air-conditioned air can be blown selectively by the damper operation from a defroster air outlet 23, a face air outlet 24 and a foot air outlet 25 provided in the heater unit 10D.

Such an air conditioning unit 10 is so constructed that the heater core 21 for effecting heating is arranged on the downstream side of the evaporator 15 which effects cooling and dehumidifying, enabling dehumidifying air conditioning where cooled and dehumidified introduced air is heated again to a suitable temperature. There is thus the merit that the temperature can be maintained and condensation on the window can be cleared.

Particularly, in an electric car or a hybrid car (using both an electric motor and an internal combustion engine as a drive source), a heat pump type air conditioner is adopted, since there is the case where no engine coolant is obtained as a heat source for heating, or the engine coolant is insufficient. In this case, a four way valve is arranged in the refrigerating cycle to reverse the refrigerant flow direction for the heating operation and for the cooling operation. Consequently, at the time of the heating operation, the above described evaporator 15 operates as a condenser, and the condenser 17 operates as an evaporator. As a result, the vehicle cabin can be heated with heat drawn from the outside air.

With the above described conventional vehicular air conditioner, since the compressor 16 is driven using the engine E as a drive source, the capacity thereof varies largely depending upon the traveling condition of the vehicle. That is to say, the discharge pressure HP and the suction pressure LP vary depending upon fluctuations in engine RPM. Consequently, since the cooling capacity of the refrigerating cycle increases substantially linearly in proportion to the RPM of the engine E, then in many cases, the cooling capacity does not meet the demand on the air conditioner side.

Therefore, with a conventional vehicular air conditioner, the cooling capacity is adjusted by switching the compressor clutch 20 ON/OFF, or cool air and warm air are mixed by making high temperature engine coolant flow into the heater core 21 to obtain a mild discharge temperature.

There is thus a problem in that a shock caused at the time of switching the clutch ON/OFF impairs the traveling feeling, or that variations in the discharge temperature impairs the air conditioning feeling. Moreover, there is another problem in that the method of mixing cool air and warm air to adjust the discharge temperature causes a needless energy loss, which goes against the recent trend of energy saving.

SUMMARY OF THE INVENTION

In view of the above situation, it is an object of the present invention to provide a vehicular air conditioner which is not influenced by fluctuations in engine RPM, and which can give good air conditioning feeling with low energy consumption.

The present inventors have focused on the fact that the suction pressure (low pressure) of the refrigerating cycle has a fixed relation to discharge temperature, and have realized a constant discharge temperature by using a demand capacity change compressor in a vehicular air conditioner of the present invention.

The demand capacity change compressor adopted herein is obtained by combining, for example, a "capacity control device for a compressor" described in U.S. Pat. No. 4,886,425 with a "capacity control device for a compressor" described in Japanese Utility Model Application, First Publication No. Sho 64-56588.

The "capacity control device for a compressor" described in U.S. Pat. No. 4,886,425 is constructed such that an actuating pressure AP of a bypass valve can be controlled by a linear function relation between suction pressure LP and the actuating pressure AP regardless of variations in discharge pressure HP. Hence, the capacity control amount of the compressor can be determined by only the suction pressure LP of the compressor.

On the other hand, the "capacity control device for a compressor" described in Japanese Utility Model Application, First Publication No. Sho 64-56588 is constructed such that a demand control mechanism for controlling a pressure to a set LP is provided as an adjunct in the capacity control device of the compressor described in U.S. Pat. No. 4,886,425 (that is, a pressure regulator) such that the characteristic of a control pressure AP output from the pressure regulator can be controlled in a parallel changing manner by an external signal, using for example, an electromagnetic coil or a stepping motor.

Hence, in the present invention the compressor capacity can be optionally controlled by an external signal. The compressor where the suction pressure (LP) can be self-controlled and for which a target suction pressure (LP) can be set using an external signal is hereinafter referred to as "demand change compressor".

A vehicular air conditioner according to a first aspect of the present invention is a vehicular air conditioner which uses a demand capacity change compressor where the suction pressure (LP) can be self-controlled and for which a target suction pressure (LP) can be set using an external signal, wherein after a discharge temperature is set according to an air conditioning load, a suction pressure (LP) of a refrigerating cycle is determined in accordance with a discharge temperature set value, and an external signal for setting the suction pressure (LP) is input to the demand capacity change compressor to thereby effect the refrigerating cycle operation.

With such a vehicular air conditioner, when determining the suction pressure (LP) of the refrigerating cycle, preferably one of, the operating speed of the blower fan and the position of the inside air/outside air changeover damper, or both of these is detected and a correction made.

Moreover, in a region outside of a control range of the demand capacity change compressor, preferably the temperature is adjusted by ON/OFF switching of a compressor clutch disposed between a drive source and the compressor. In this case, the demand capacity change compressor may be judged to be in a region outside of the control range, by comparing the discharge temperature set value with an actual discharge temperature.

Furthermore, the air conditioning load may be determined from a detected value for outside temperature and a position of an air conditioning strength selection switch.

With such a vehicular air conditioner, since the suction pressure is determined in accordance with a discharge temperature set according to the air conditioning load, by inputting the discharge temperature as an external signal to the demand capacity change compressor, the suction pressure (LP) can be set to a desired value. Therefore, since the suction pressure (LP) of the refrigerating cycle and the discharge temperature of air having passed through an evaporator are in a fixed relation, even if the engine RPM fluctuates, a constant discharge temperature can be maintained.

BRIEF DESCRIPTION OF THE DRAWING

FIG. 3 is a diagram for explaining the operation of a capacity control device of the demand capacity change compressor shown in FIG. 2.

FIG. 4 is a schematic flow diagram showing a construction of the vehicular air conditioner.

DESCRIPTION OF THE PREFERRED EMBODIMENT

As follows is a description of an embodiment of a vehicular air conditioner according to the present invention with reference to FIG. 1 through FIG. 4.

Figure 1:
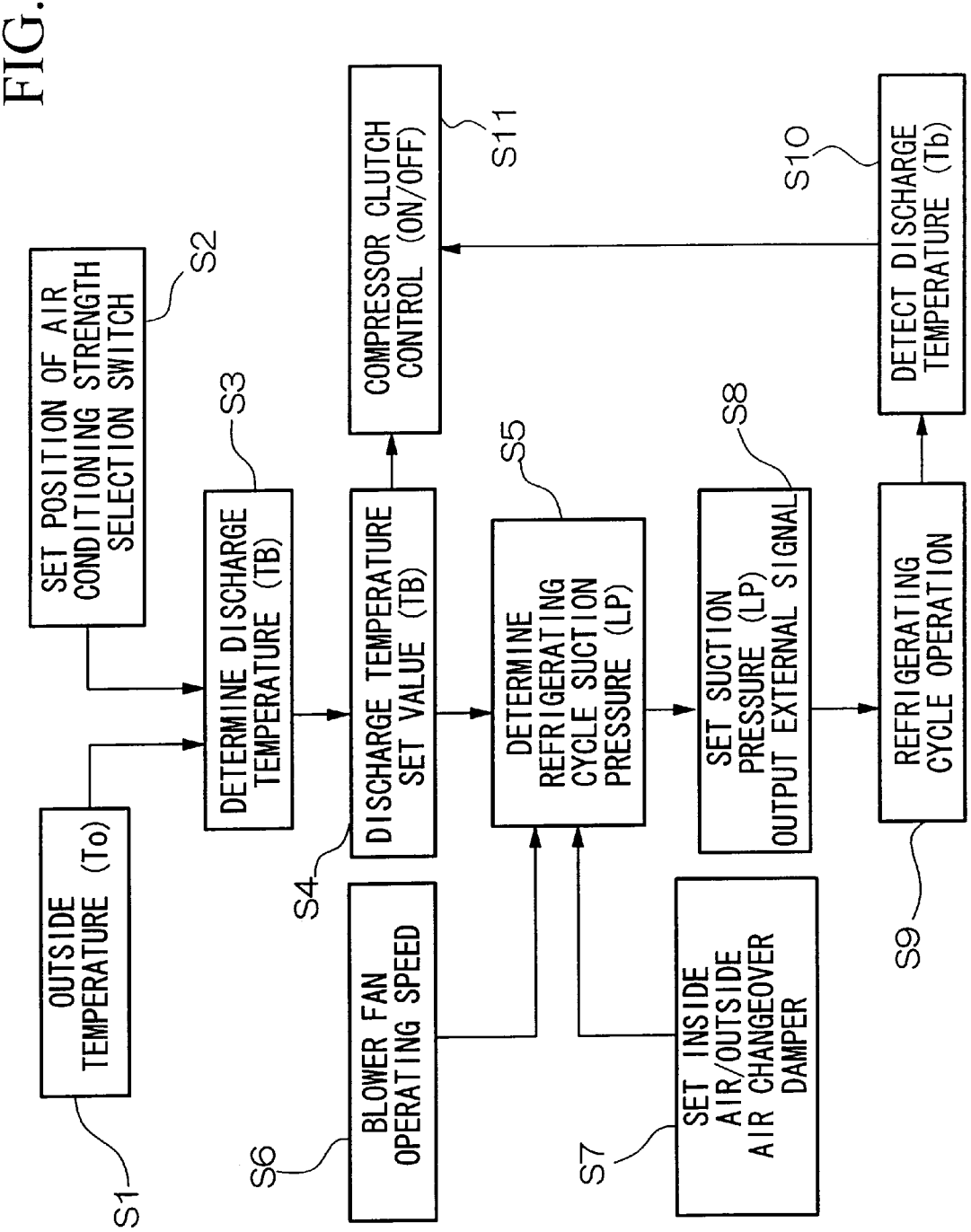
FIG. 1 is a flow chart showing an embodiment of a vehicular air conditioner according to the present invention.

The basic construction of the vehicular air conditioner to which the present invention is applied may use the same technique as in the conventional art shown in FIG. 4, except that the compressor 16 is replaced by a demand capacity change compressor 16A and that the contents of a flow chart shown in FIG. 1 are added to the a control section 11. Hence, the description of these will be omitted here.

The flow chart shown in FIG. 1 shows a procedure for controlling the discharge temperature Tb to be constant by using the demand capacity change compressor 16A. The demand capacity change compressor 16A in this case is described as one for supplying refrigerant to the evaporator 15 for exchanging heat with introduced air for cooling and dehumidifying.

In step 1 (hereinafter referred to as S1), outside temperature To, being one of the conditions for determining the air conditioning load, is detected by an outside temperature sensor 26.

In parallel with this detection, a set position of the air conditioning strength selection switch 12a (hereinafter referred to as air conditioning strength position) arranged in the operation section 12 is detected in S2, as another condition for determining the air conditioning load. In the example shown in FIG. 4, set positions are arranged in 5 stages from "weak" to "strong", and can be suitably selected and changed according to the preference of a passenger by a manual operation. The set positions are not limited to 5 stages, and may be multiple stages more than 5, or may be set steplessly.

In subsequent S3, a target discharge temperature TB is determined according to the detected outside temperature To and the air conditioning strength position. This determination is performed in such a manner that, for example, when the outside temperature To is high and the air conditioning strength position is set to "strong", the target discharge temperature TB is set considerably lower than the outside temperature To, judging that a passenger feels hot (the air conditioning load is large). Moreover, in the case where the air conditioning strength position is set to "weak" even though the outside temperature To is high, it can be judged that the temperature in the vehicle cabin is in a suitable state (the air conditioning load is small), and the target discharge temperature TB is thus set to be close to the outside temperature To.

The target value of the discharge temperature Tb determined in this manner is hereinafter referred to as discharge temperature set value TB.

In subsequent S5, the suction pressure LP for the refrigerating cycle is determined. The suction pressure LP is determined by utilizing the fact that there is a fixed relation between the suction pressure LP and the discharge temperature Tb. Therefore, once the discharge temperature set value TB is determined, the suction pressure LP of the demand capacity change compressor 16A corresponding to this is automatically determined.

The determination of the suction pressure LP is based on the discharge temperature set value TB. However, as required, the suction pressure LP may be corrected by detecting the operating speed of the blower fan 14 provided as a fan for blowing air (S6), or may be corrected by detecting the set position of the inside air/outside air changeover damper 13, that is, which air is being drawn in, outside air "a" or inside air "b" (S7). Of course this may be corrected by detecting both the operating speed of the blower fan 14 and the set position of the inside air/outside air changeover damper 13.

Correction of the suction pressure LP based on the operating speed of the blower fan 14 is performed in the following manner. That is to say, a high operating speed of the blower fan 14 means that the quantity of introduced air is large. Therefore if the refrigerant quantity supplied to the evaporator 15 is the same, the temperature change due to the heat exchange is reduced. Consequently the discharge temperature set value TB will not be reached. Hence, to increase the refrigerant supply quantity, the suction pressure LP is corrected in a direction of increase.

Correction of the suction pressure LP based on the set position of the inside air/outside air changeover damper 13 is performed, considering that the temperature of the introduced air will differ depending on whether there is outside air "a" or inside air "b". That is to say, at the time of the cooling operation, the temperature of the inside air "b" is lower than the temperature of the outside air "a", resulting in a lower air conditioning load, except at the time immediately after initiating the operation. Hence, to reduce the refrigerant supply quantity at the time of introducing inside air "b", the suction pressure LP is corrected in a direction of decrease.

The suction pressure LP determined in this manner is converted to a pulse signal in S8, and output as an external signal. This pulse signal is set corresponding to the control range of the suction pressure LP in the demand capacity change compressor 16A.

Specifically, when the control range of the demand capacity change compressor 16A is from 0.5 to 4.0 Kg/cm$^2$G, zero pulses is made to correspond to 0.5 Kg/cm$^2$G and 242 pulses is made to correspond to 4.0 Kg/cm$^2$G. If the pulse signal is changed in a range of from 0 to 242 pulses, then the suction pressure LP can be controlled by giving suction pressure LP instructions to the demand capacity change compressor 16A from outside.

With the demand capacity change compressor 16A, upon reception of the pulse signal, an urging force due to a spring in a pressure regulator described later changes in response to the pulse signal.

Figure 2:
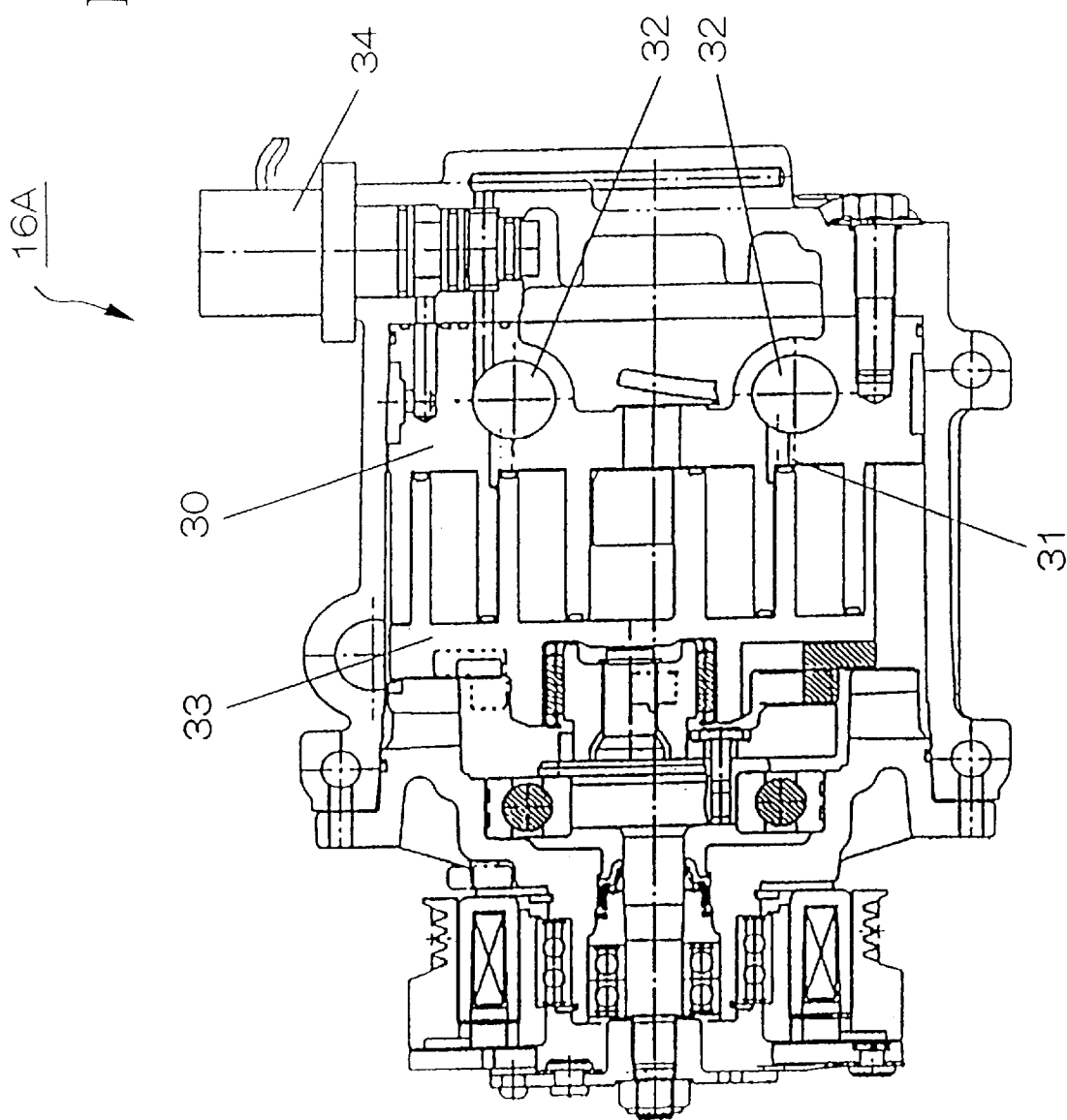
FIG. 2 is a schematic sectional view of a demand capacity change compressor used in the vehicular air conditioner according to the present invention.

Next is a description of the construction of the demand capacity change compressor 16A and the operating principle with reference to FIG. 2 and FIG. 3. The demand capacity change compressor 16A shown in FIG. 2 is provided with a bypass port 31 in a stationary scroll 30 of a scroll type compressor. The refrigerant quantity released from the bypass port 31 can be controlled depending upon the position of a bypass valve (piston) 32. That is, the opening area of the bypass port 31 is changed by changing the position of the bypass valve 32 with the AP. Incidentally, numeral 33 in the drawing denotes a revolving scroll.

The bypass valve 32 is operated by the actuating pressure AP provided from the pressure regulator 35 in the capacity control device 34. The actuating pressure AP is expressed by $(AP=K \times LP-\alpha)$. In this equation K is a constant determined by a pressure receiving area of a diaphragm and a pressure receiving area of a feedback piston in the pressure regulator 35, LP is a suction pressure, and $\alpha$ is a value which changes according to a an urging force of the spring depressing the diaphragm. In this case $\alpha$ is changed when a stepping motor 36 in the pressure regulator 35, which is actuated by receiving the pulse signal, controls the compression amount of a variable spring 37. Incidentally, numeral 36a in the figure denotes a screw portion which rotates together with the stepping motor 36.

In FIG. 3, numeral 38 denotes a diaphragm, 39 denotes a three way valve, 40 denotes a feedback piston, and 41 denotes a pressure setting spring. The forces acting are; an upward thrust on the diaphragm 38 due to the suction pressure LP, a downward thrust of a differential pressure (AP-LP) acting on the feedback piston 40, a downward urging force due to the pressure setting spring 41, and a downward urging force due to the variable spring 37 controlled by the stepping motor 36.

When the suction pressure LP changes with the stepping motor 36 stopped (the urging force due to the variable spring 37 is constant), the diaphragm 38 is displaced upward with the increase of the suction pressure LP. Moreover, the feedback piston 40 and a ball 39a of the three way valve 39 provided integrally with the diaphragm 38 move upward. Therefore, in the three way valve 39, the valve opening on the discharge pressure HP side increases, and the valve opening on the suction pressure LP side decreases. As a result, the actuating pressure AP increases.

The actuating pressure AP is introduced to the feedback piston 40, to restrain the amount of upward movement of the ball 39a of the three way valve 39 by means of the differential pressure between the suction pressure LP and the actuating pressure AP, so that they balance at a balance point where the actuating pressure AP becomes a value of the balance equation $(AP=K \times LP-\alpha)$. In other words, the suction pressure LP can be self-controlled as a linear function of the actuating pressure AP, regardless of variations in the discharge pressure HP.

When the suction pressure LP decreases, the movement is in the opposite direction, and the actuating pressure AP is similarly determined.

If it is desired to reduce the capacity of the compressor, the stepping motor 36 is rotated in a direction for decreasing the urging force due to the variable spring 37. When the urging force due to the variable spring 37 decreases, $\alpha$ in the balance equation becomes smaller, and the set value of the suction pressure LP is corrected to a lower value. Therefore, the control pressure AP for the same LP increases so that the bypass quantity increases. Hence, the capacity of the demand capacity change compressor 16A (the discharge quantity of the compressor) decreases, decreasing the suction pressure LP.

On the contrary, when it is desired to increase the capacity of the compressor, the stepping motor 36 is rotated in a direction for increasing the urging force due to the variable spring 37. When the urging force due to the variable spring 37 increases, a in the balance equation becomes larger, and the output of the control pressure AP becomes smaller so that the bypass quantity decreases. Hence the capacity of the demand capacity change compressor 16A increases, increasing the suction pressure LP.

In this manner, if the stepping motor 36 is actuated to adjust the urging force due to the variable spring 37, the suction pressure LP can be set by an external signal, such as a pulse signal.

If the suction pressure LP is set in accordance with the pulse signal output in S8 as described above, the refrigerating cycle operation is effected by the above described self control function (S9) with the desired suction pressure LP being maintained regardless of variations of the discharge pressure HP.

Accordingly, the discharge temperature Tb can be maintained constant in a fixed relation with the suction pressure LP, enabling air conditioning operation with good feeling. Moreover, maintenance of such a discharge temperature Tb is performed by adjusting the refrigerant quantity supplied to the evaporator 15. Hence the compressor clutch 20 need not be switched ON/OFF. That is to say, even if engine RPM changes, if it is within a control range, a constant discharge temperature Tb approximating to the discharge temperature set value TB can be realized. Hence, temperature adjustment by means of mixing warm air and cool air which needlessly consumes energy is not required.

With the demand capacity change compressor 16A, however, since a control range exists, an actual discharge temperature Tb is detected (S10) and compared with the discharge temperature set value TB set in S4. As a result, since a large difference occurs between TB and Th outside the control range, then in such a case the compressor clutch 20 is switched ON/OFF to execute temperature adjustment by means of clutch control (S11). Since ON/OFF switching of the compressor clutch is limited to a range outside the control range, then this is infrequent compared to the conventional apparatus.

In the above description, the description has been for where the refrigerant is supplied to the evaporator 15 to effect the cooling and dehumidifying operation. However this of course is also applicable to the heat pump type air conditioner which can be applied to both the cooling operation and the heating operation.

With the vehicular air conditioner of the present invention, even if engine RPM change, a constant discharge temperature can be realized. Hence, not only good air conditioning feeling but also good traveling feeling without the shock due to switching the clutch ON/OFF can be provided.

Furthermore, since there is no need to adjust the temperature by mixing cool air and warm air, the vehicular air conditioner of the present invention can also contribute to energy saving.

What is claimed is:

1. A vehicular air conditioner comprising:

a demand capacity change compressor configured to self-control at a target suction pressure set using an external signal and based on a discharge temperature set according to an air conditioning load, wherein the target suction pressure is determined in accordance with said discharge temperature and the external signal is input to said demand capacity change compressor to thereby affect a refrigerating cycle operation.

2. A vehicular air conditioner according to, claim 1, wherein said suction pressure is determined by the operating speed of a blower fan.

3. A vehicular air conditioner according to claim 1, wherein said suction pressure is determined by the position of an inside air/outside air changeover damper.

4. A vehicular air conditioner according to claim 1, wherein, for a region outside of a control range of said demand capacity change compressor, the discharge temperature is adjusted by ON/OFF switching of a compressor clutch disposed between a drive source and the compressor.

5. A vehicular air conditioner according to claim 4, wherein said demand capacity change compressor is judged to be in a region outside of the control range by comparing a discharge temperature set value with said discharge temperature.

6. A vehicular air conditioner according to any one of claim 1 through claim 5, wherein said air conditioning load is determined from a detected value for outside temperature and a position of an air conditioning strength selection switch.

* * * * *

UNITED STATES PATENT AND TRADEMARK OFFICE
CERTIFICATE OF CORRECTION

PATENT NO.    : 6,233,957 B1  Page 1 of 1
DATED         : May 22, 2001
INVENTOR(S)   : Hirao et al.

It is certified that error appears in the above-identified patent and that said Letters Patent is hereby corrected as shown below:

<u>Title page,</u>
Item [73], the Assignee information should read:
-- [73]   Assignees:   Mitsubishi Heavy Industries, Ltd.,
Tokyo (JP); General Motors Corporation,
Detroit, MI (US) --

Signed and Sealed this

Eighth Day of October, 2002

*Attest:*

*Attesting Officer*

JAMES E. ROGAN
*Director of the United States Patent and Trademark Office*